United States Patent [19]

Tsunekuni et al.

[11] Patent Number: 4,712,100
[45] Date of Patent: Dec. 8, 1987

[54] COORDINATE INPUTTING APPARATUS USING MULTIPLE SENSORS

[75] Inventors: Masao Tsunekuni; Yasuhisa Ishizawa, both of Yokohama, Japan

[73] Assignee: Canon Kabushiki Kaisha, Tokyo, Japan

[21] Appl. No.: 733,390

[22] Filed: May 13, 1985

[30] Foreign Application Priority Data

May 18, 1984 [JP] Japan .................................. 59-98537

[51] Int. Cl.⁴ ............................................ G09G 1/00
[52] U.S. Cl. .................................... 340/710; 340/709; 340/706; 178/18; 250/237 G
[58] Field of Search .................. 340/709, 710, 706; 178/18; 250/221, 237 G, 578

[56] References Cited

U.S. PATENT DOCUMENTS

| | | | |
|---|---|---|---|
| 4,354,102 | 10/1982 | Burns et al. | 340/710 |
| 4,390,873 | 6/1983 | Kirsch | 340/710 |
| 4,409,479 | 10/1983 | Sprague et al. | 340/710 |
| 4,521,773 | 6/1985 | Lyon | 340/710 |

FOREIGN PATENT DOCUMENTS

2154734  2/1985  United Kingdom ............... 340/710

*Primary Examiner*—John W. Caldwell, Sr.
*Assistant Examiner*—Jeffery A. Brier
*Attorney, Agent, or Firm*—Fitzpatrick, Cella, Harper & Scinto

[57] ABSTRACT

A coordinate inputting apparatus comprises: an information plate on which patterns such as white circles and black regions having different reflectances are provided like a matrix; an operating section which is movable over this plate and has therein optical systems each consisting of a light emitting section to emit the light flux onto this plate and a light receiving section to detect the reflection light flux from the plate; and a calculating section to derive the coordinates on the plate based on the output signals from the light receiving sections in association with the movement of the operating section. When one of the optical systems is located at the center of the circle, the others may be arrayed around the circumference of this circle so as to divide the circumference into equal parts. With this apparatus, by optically reading the simple and durable circles, the movement quantity and moving direction of the operating section itself can be accurately detected without being influenced by an electromagnetic disturbance.

8 Claims, 11 Drawing Figures

COORDINATE INPUTTING APPARATUS USING MULTIPLE SENSORS

BACKGROUND OF THE INVENTION

1. Field of the Invention

The present invention relates to a coordinate inputting apparatus consisting of an information plate and an operating section arranged movably on this information plate and, more particularly, to a coordinate inputting apparatus having a reflection optical system consisting of a light emitting section, an information plate and a light receiving section in which the operating section itself can detect the self movement quantity and moving direction.

2. Description of the Prior Art

Coordinate inputting apparatuses in which the operating section itself detects the self movement quantity and moving direction and supplies the coordinate information to an external information processing apparatus are widespread. This is because such a kind of coordinate inputting apparatuses have various advantages such that the operating efficiency in inputting is extrememly better as compared with a conventional cursor moving key or the like and there is no need to directly reach a long arm toward the screen and operate such as in case of a light-pen, and the like.

Hitherto, as such a kind of coordinate inputting apparatuses, following various kinds of apparatuses have been proposed: an apparatus which detects the movement from the rolling of the ball; an apparatus which derives a coordinate value from a value of a voltage drop due to a resistance; an apparatus using an electromagnetic induction system, etc. However, the apparatuses including a mechanical portion are less than wholly satisfactory in terms of durability and accuracy and most of those apparatuses are large in scale. On the other hand, the voltage drop type and electromagnetic induction type have drawbacks such that they are likely to be influenced by disturbances.

SUMMARY OF THE INVENTION

The present invention is made in consideration of the drawbacks of the foregoing conventional technology and it is an object of the invention to provide a coordinate inputting apparatus in which by optically reading a simple and durable pattern formed on the information plate, accuracy of reading the coordinates and reliability are made high, and also the apparatus is not influenced by electromagnetic disturbances.

According to the invention is provided a coordinate inputting apparatus which outputs data indicative of the moving direction and movement quantity on the basis of output signals from a plurality of light receiving means.

Also according to the invention is provided a coordinate information plate consisting of a plane and a plurality of regions which exist in this plane and whose reflectances are different from that of the plane.

BRIEF DESCRIPTION OF THE DRAWINGS

FIGS. 7A and 7C are diagrams showing signal waveforms in the respective sections in the case where the operating section is moved in the direction opposite to that in FIG. 6A, the movement being shown in FIG. 7A.

DETAILED DESCRIPTION OF THE PREFERRED EMBODIMENTS

A coordinate inputting apparatus of one embodiment according to the present invention will now be described in detail hereinbelow with reference to the drawings.

Figure 1:
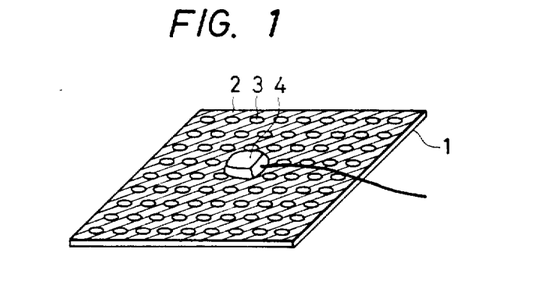
FIG. 1 is a perspective view showing an outside appearance of a coordinate inputting apparatus of one embodiment according to the present invention.

FIG. 1 is a perspective view showing an outside appearance of the coordinate inputting apparatus of one embodiment according to the invention. This apparatus can be used as an input section of a word processor, a personal computer or the like. In the diagram, a reference numeral 1 denotes an information plate in which a plurality of white circles 3 are written like a matrix on a black surface 2; and 4 is an operating section which can be manually freely moved on the information plate 1 and which optically detects a pattern on the plate and thereby deriving the information regarding the movement quantity and moving direction of the operating section and then outputting this information.

Figure 2:
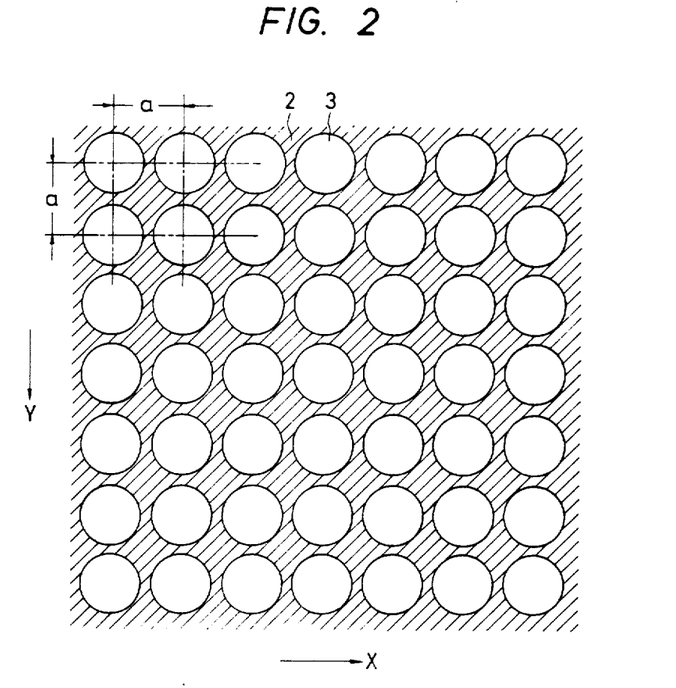
FIG. 2 is a partial enlarged diagram showing a partially magnified surface of an information plate of FIG. 1.

FIG. 2 is a partial enlarged diagram showing a partially magnified surface of the information plate 1. In the diagram, the interval between the centers of the respective white circles 3 arranged like a matrix is equal, namely, it is set to a. Therefore, by detecting that the optical system of the operating system 4 is moved from a circle to another circle, it can be found that the operating section 4 is moved by one unit with respect to an X axis or a Y axis of the information plate 1. A size of one unit (a) is determined to an appropriate size relative to the movement range suitable for the operation of the operating section 4. If one unit is large, merely a small amount of coordinate information can be derived even if the operating section is moved by a large quantity, so that an operating efficiency is degraded. On the contrary, if one unit is set to be too small, the detecting sensitivity becomes high and the coordinate information may have been generated even for a slight vibration of the operating section 4, so that the operating efficiency becomes unstable. Therefore, the optimum size is derived in the case where the movement of one unit of the operating section 4 corresponds to the movement of one dot on the screen and at the same time the movement of the whole screen can be operated on the information plate of a proper size.

Although the inside of the circle 3 on the information plate 1 is white and the surface 2 is black in this embodiment, they may be opposite. In addition, these colors are not limited to the two colors of white and black. In other words, the object of the invention can be sufficiently attained if the information plate 1 has such a structure that the reflectances of the inside of the circle 3 and of the surface 2 relatively differ.

Figure 3:
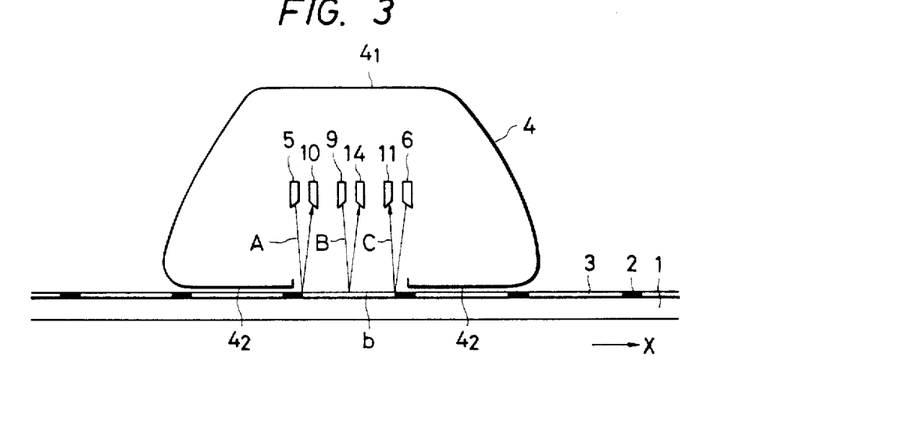
FIG. 3 is a cross sectional view showing a principle arrangement of an operating section.

FIG. 3 is a cross sectional view showing a principle arrangement of the operating section 4. In the diagram, the operating section 4 has a head $4_1$ adapted to be grasped by means of the palm of a hand upon operation. A slide surface $4_2$ having a proper extent is provided on the lower side of the operating section 4. The operating section 4 can be freely moved on the surface of the information plate 1 through the slide surface $4_2$. The portion of this slide surface may be rollers, wheels or the like. Light emitting sections 5, 9 and 6 provided in the operating section 4 serve to illuminate the luminous flux onto the information plate 1. For instance, light emitting devices such as LEDs, tungsten lamps, laser or the like may be used as light sources. Or, a single light emitting device may be used as a light source and the light emitted therefrom is dispersively led to a plurality of optical paths using an optical fiber scope or the like and the edge surface of the optical fiber scope may be aligned with the position of each light emitting section. Numerals 10, 14 and 11 denote light receiving sections to detect the luminous flux reflected by the information plate 1. For instance, photodiodes, phototransistors, Cds, etc. may be used as light receiving sections. Optical systems A, B and C are constituted in such a manner that the lights emitted from the respective light emitting sections 5, 9 and 6 are reflected by the surface of the information plate 1 and enter the respective light receiving sections 10, 14 and 11. In the case where the operating section 4 is located just over a single circle b as shown in the diagram, the light radiated from the light emitting section 9 all enters the light receiving section 14, while almost half of the lights emitted from the other light emitting sections 5 and 6 are absorbed by the black surface 2 and the residual half of the lights enter the light receiving sections 10 and 11. Consequently, it will be understood that if the position of the operating section 4 is deviated by merely a slight amount to the right or left (in the X-axis direction), the optical system B won't be influenced at all but the optical systems A and C are shifted to the opposite states.

Figure 4:
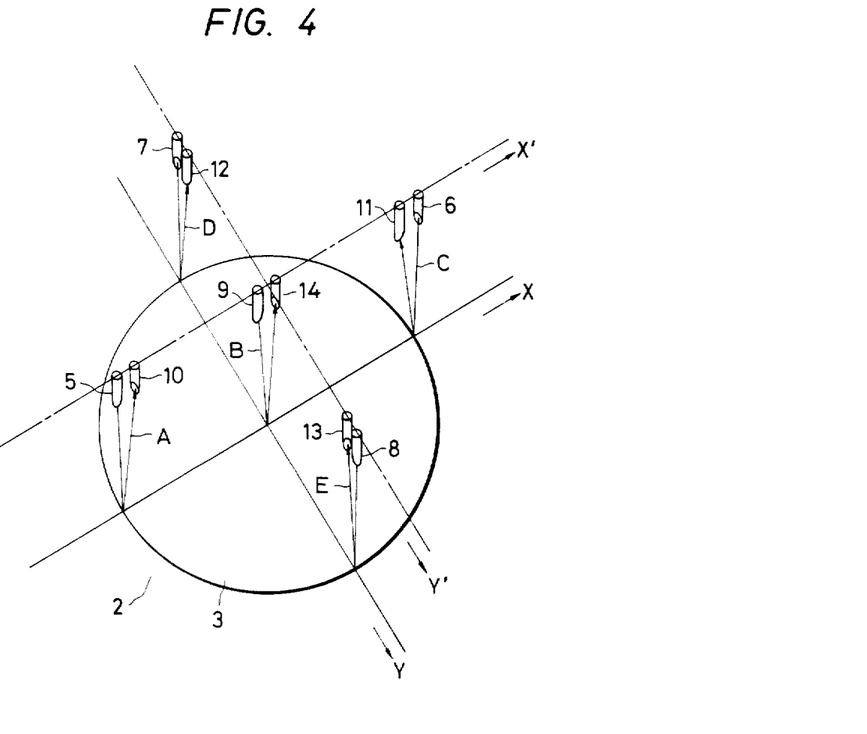
FIG. 4 is a perspective view showing some of the principles of the arrangement of the optical system in the operating section.

FIG. 4 is a perspective view showing a principle arrangement of the optical system in the operating section 4. Now assuming that the X axis of the operating plate 1 corresponds to the direction shown in the diagram, optical systems D and E are arranged at the positions over the Y axis which perpendicularly crosses the X axis. The constitutions and arrangements of the optical systems D, B and E are similar to those described with respect to FIG. 3. Namely, the optical system D consists of a light emitting section 7 and a light receiving section 12, while the optical system E consists of a light emitting section 8 and a light receiving section 13. When the central optical system B is located in correspondence to the center of the circle 3, the other four optical systems A, C, D, and E are located substantially over the circumference of the circle 3. With such an arrangement, with regard to the X axis and Y axis of the information plate 1 as well, the movement quantity and moving direction can be detected on the basis of similar algorithms.

In actual use of the operating section 4, there is a large possibility such that the X' and Y' axes presumed for the optical system of the operation section 4 do not overlap with the X and Y axes presumed on the information plate 1. Such a situation is caused due to the grasping condition of the operating section 4 or the rotational movement of the end of a hand to move the operating section. However, even in such a case, even if the overlapping in the axial direction is slightly deviated, no problem will be caused since a subject to be detected on the information plate 1 is a circle. As described above, the operating section 4 includes no mechanical portion, so that a high accurate operating section can be easily constituted and also its precision will not be lost even by the use for a long period. In addition, since internal optical systems are surrounded by the operating section 4, the light from the outside is substantially cut off and it cannot become a disturbance. Also, the optical systems are not influenced by the electromagnetic field.

Figure 5:
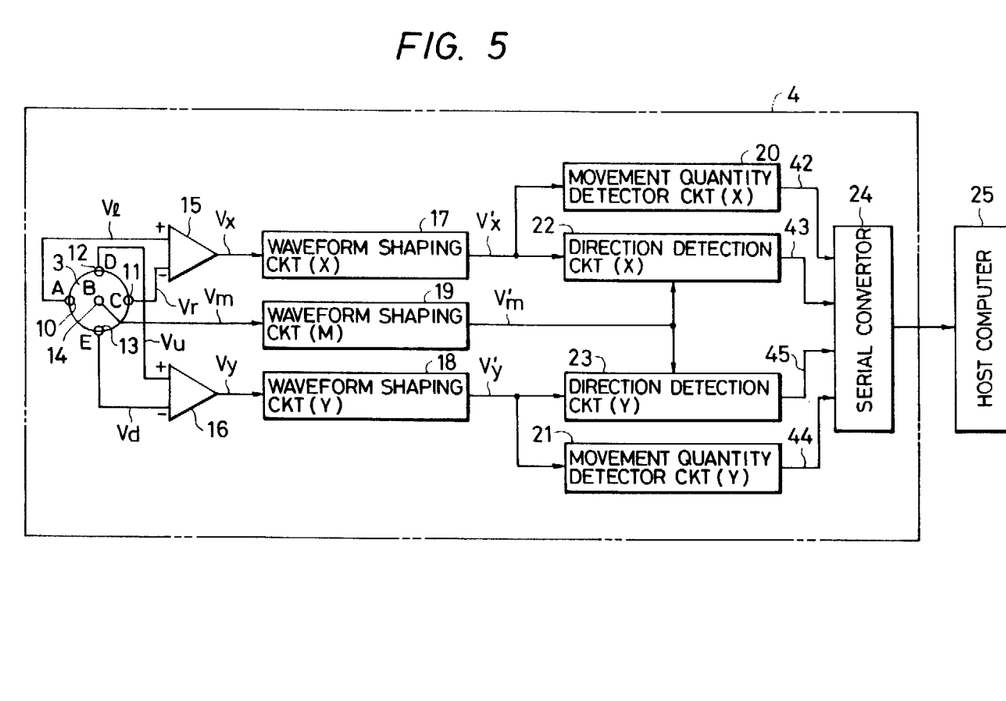
FIG. 5 is a block diagram showing an arrangement for processing a detection signal of the optical system and thereby obtaining the movement quantity and moving direction of the operating section.
Figure 6A:
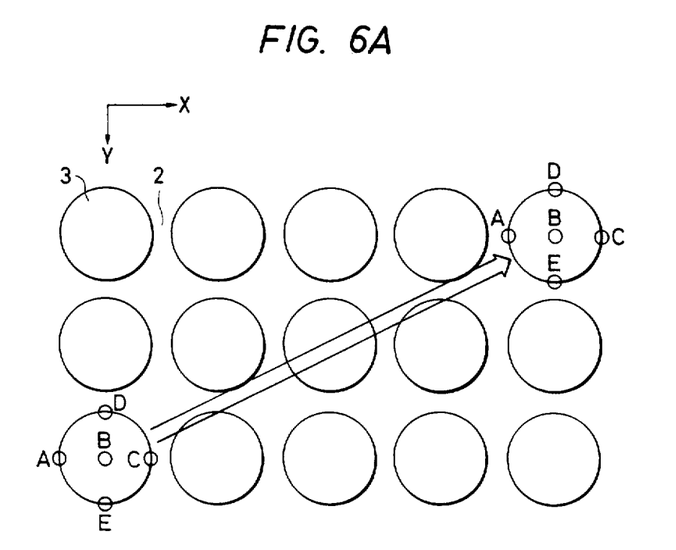
FIGS. 6A and 7A show movement of the operating section.
Figure 6B:
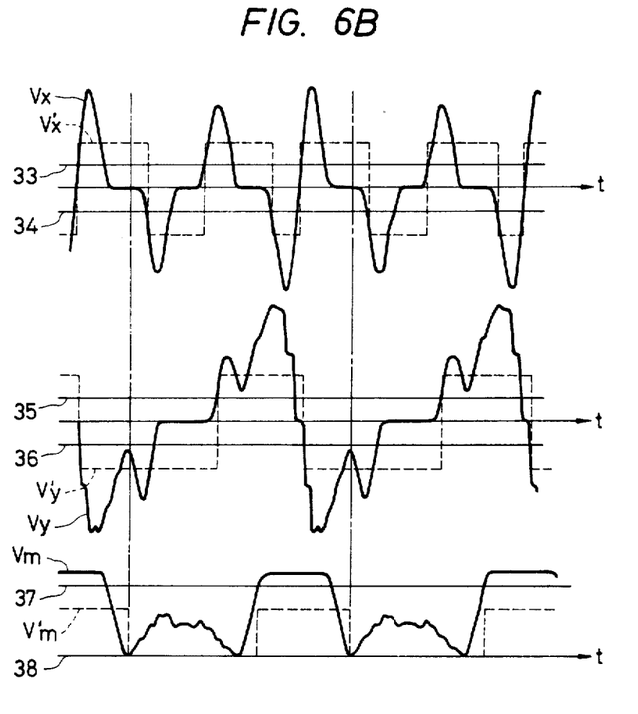
FIGS. 6B and 6C are diagrams showing signal waveforms in respective sections in the case where operating section is moved on the information plate the movement being shown in FIG. 6A.
Figure 6C:
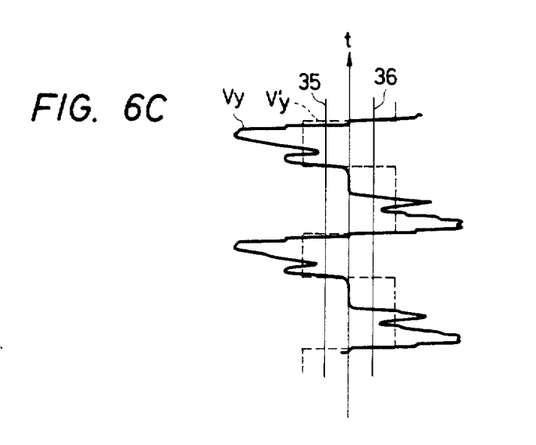
Figure 7A:
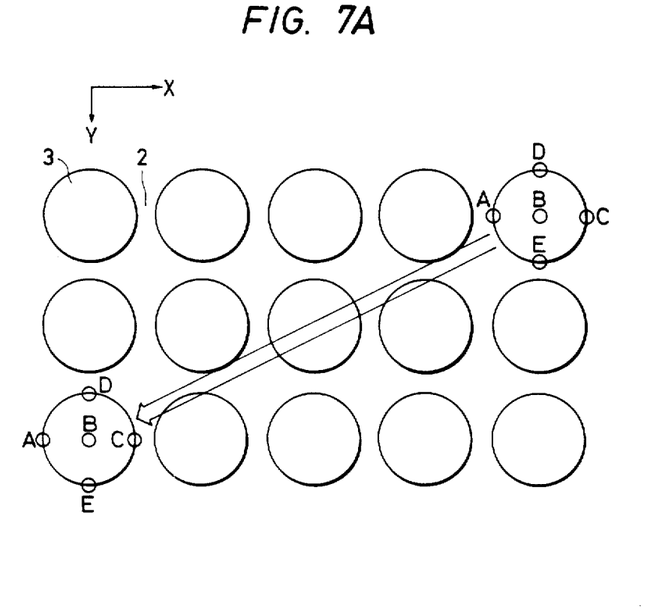
Figure 7B:
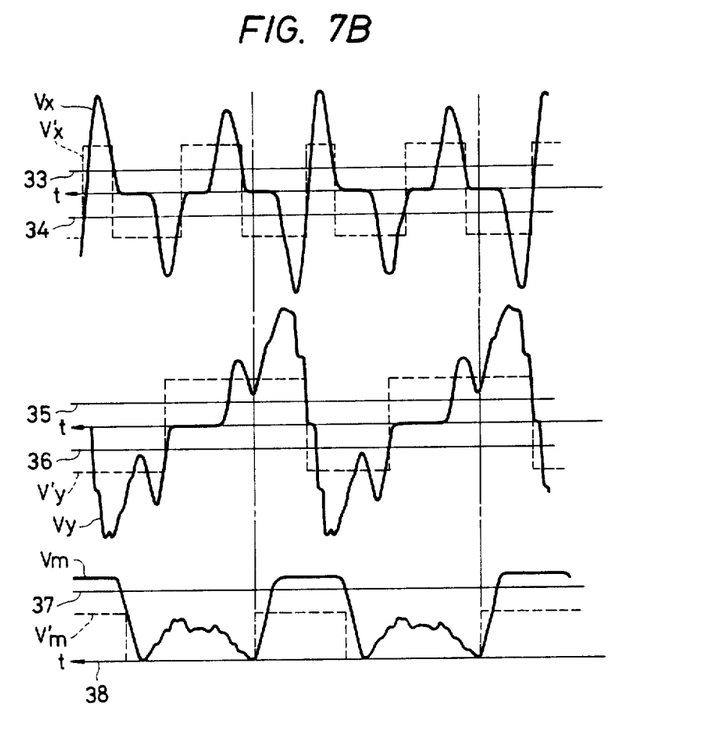
Figure 7C:
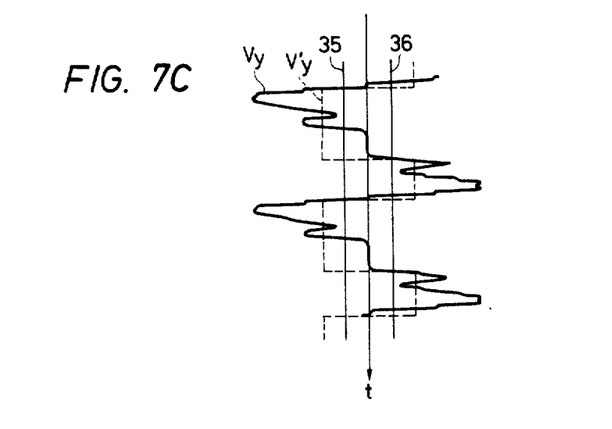

In operation, when the above-described operating section 4 is moved over the information plate 1, characteristic detection signals are generated from the respective optical systems. FIG. 5 is a block diagram showing an arrangement to process those detection signals and thereby to derive the movement quantity and moving direction of the operating section 4. FIGS. 6B and 6C are diagrams showing signal waveforms in the respective sections in the case where the operating section 4 is moved over the information plate 1 from the current portion in the positive direction of the X axis by four units and in the negative direction of the Y axis by two units (see FIG. 6A). FIGS. 7B and 7C are diagrams showing signal waveforms in the respective sections in the case where the operating section 4 is moved in the directions opposite to the case of FIG. 6A (see FG. 7A). The operation of the apparatus in this embodiment will then be explained hereinbelow with reference to these diagrams.

FIG. 5 shows the light receiving section 14 located over the center of the circle 3 and the light receiving sections 10 to 13 located over the circumference of the circle 3. Signals Vl and Vr which are outputted from the light receiving sections 10 and 11 corresponding to the X axis of the information plate 1 are respectively inputted to positive and negative input terminals of a differential amplifying circuit 15. A difference output signal $Vx(=Vl-Vr)$ is outputted from an output terminal of the differential amplifying circuit 15. Therefore, when the light receiving sections 10 and 11 are located over the circle 3 symmetrically with respect to left and right as shown in the diagram, the output of the differential amplifying circuit 15 is 0 volt. On the other hand, when the operating section 4 is slightly deviated to the left, a signal of $-Vx$ is outputted and when it is slightly deviated to the right, a signal of $+Vx$ is outputted. The signal waveforms in the case where the operating section 4 is moved to the left and right over the information plate 1 in accordance with this relation are indicated by the signals Vx in FIGS. 6B and 7B. Now, it should be noted that the directions of a time base t are opposite in FIGS. 6B and 7B. This is because the time base t is set in accordance with the moving direction of the operating section 4 and the signal Vx is expressed in this direction. The same shall apply also to the cases of other signals which will be mentioned later.

A difference output signal $Vy(=Vu-Vd)$ is outputted from a differential amplifying circuit 16. When the operating section 4 is slightly deviated upward from the position shown in the diagram, the differential amplifying circuit 16 outputs a signal of $-Vy$ and when it is slightly deviated downward, the circuit 16 outputs a signal +Vy. The signal waveforms in the case where the operating section 4 is moved upward and downward over the information plate 1 in accordance with this relation are shown by the signals Vy in FIGS. 6B, 6C, 7B, and 7C.

A signal from the light receiving section 14 becomes a signal Vm as it is. The light receiving section 14 outputs a signal of +Vm while the optical system B of the operating section 4 is moving over the circle 3.

Numerals 17 and 19 denote waveform shaping circuits having hysteresis characteristics. The signals Vx, Vy and Vm are respectively supplied to the waveform shaping circuits 17, 18 and 19, so that square wave signals Vx', Vy'and Vm' are derived. The threshold levels having the hysteresis characteristics are shown by, for example, levels 33 to 38 in FIGS. 6B and 6C. The same shall also apply to FIGS. 7B and 7C. When the signal Vx exceeds the level 33 in the positive direction in this relation with the threshold levels, a signal of +1 is outputted to an output terminal of the waveform shaping circuit 17. When the signal Vx exceeds the level 34 in the negative direction, a signal of −1 is outputted to the output terminal of the circuit 17. The same shall also apply to the relation between the signal Vy and the square signal Vy'. On one hand, only when the light receiving section 14 is located over the circle 3, the signal Vm is positive and when it is located over the surface 2, the signal Vm is 0 volt. Therefore, the square signal Vm' which is outputted from an output terminal of the waveform shaping circuit 19 is +1 only when the light receiving section 14 is located over the circle 3 and it is 0 volt when the section 14 is located over the surface 2.

In comparison of the foregoing respective signals between FIGS. 6B, 6C and FIGS. 7B, 7C, the following results will be understood. First, with respect to the square wave signal Vm', even in the case where the operating section 4 is moved in any direction along the time base t, no difference is caused in the timing level. However, for the square wave signal Vx', a difference is generated. This result is obtained because each detection signal of the optical systems A and C is supplied as a difference input to the differential amplifying circuit having a fixed polarity and its difference output signal is waveform shaped to become the square wave signal by the waveform shaping circuit having a hysteresis characteristic. On the basis of this difference, a direction detection circuit 22 checks the level of the square wave signal Vx' in response to each trailing edge of the square wave signal Vm'. When this level is +1, it is determined that the moving direction of the operating section is positive. Contrarily, when the level is −1, it is decided that the moving direction of the operating section 4 is negative. A movement quantity detection circuit 20 of the X axis detects the leading or trailing edge of the square wave signal Vx' and counts it and thereby to obtain the movement quantity which is integer times larger than one unit. On one hand, if both of the leading and trailing edges are counted, when the counting result becomes an odd number, the movement quantity of the order of ½ of one unit can be detected. The same shall apply to a Y-axis direction detection circuit 23 and a movement quantity detection circuit 21. Data 42 to 45 regarding the movement quantity and moving direction are transmitted to the host computer 25 through a serial converter 24. By arranging the constitution to obtain the information of movement quantity and moving direction in the operating section 4, only digital signals indicative of the movement quantity and moving direction finally derived may be transmitted to the host computer 25; therefore, the coordinate information can be always inputted with a high reliability.

In the foregoing embodiment, the discrete light receiving devices are used at the light receiving sections 10 to 14, but the invention is not limited to these devices. For instance, the edge surface of the optical fiber scope is arranged at the position of each light receiving section and the light received at each edge surface is led to another position and can be read by means of a photoelectric converting device (CCD line sensor). On the other hand, it has already been mentioned that the optical fiber scope can be used in the light emitting sections as well. With such an arrangement, degrees of freedom for selection and arrangement of not only the light receiving devices but also the light emitting devices become large and the shape of the detecting section at the tip of the operating section can be made thin like a point of a pen. Moreover, the devices can be easily attached and adjusted and if the detection signals are transmitted as photo signals, they are not affected by an electromagnetic disturbance, resulting in an improvement in reliability.

In addition, when the movement quantity is detected by counting the respective edges of the square wave signals Vx' and Vy' mentioned above, if switching means is provided to perform the selection with respect to that the leading edge or trailing edge is counted or that both of the leading and trailing edges are counted, the resolution in detection of the movement quantity can be also controlled.

As described above, according to the present invention, since the pattern on the information plate consists of circles, it can be easily constituted by small circles with a high degree of accuracy. Also, since the operating section reads this circular pattern as a reference pattern, even if the X and Y axes of the operating section are deviated slightly from the X and Y axes of the information plate in operation, the reading accuracy is not influenced. On one hand, different from a line pattern, even if the circle itself is slightly scractchy, there is no risk such that this portion is skipped. In this meaning, it can be said that circles are strong as patterns.

The detecting method of the operating section is based on the optical method and no mechanical portion is included at all. Therefore, no abrasion portion exists and a high reading precision is kept for a long time. Also, since the optical detecting method is adopted, it is not influenced by a disturbance of the electromagnetic noise or the like.

What we claim is:
1. A coordinate inputting apparatus comprising:
   an information plate in which a plurality of patterns are provided at equal intervals in the form of a matrix, at least one said pattern having a periphery and a center and each of said patterns being symmetrical with respect to its center;
   a plurality of first sensing means arranged relative to positions which are symmetrical with respect to said center of said pattern and which are substantially on said periphery of said pattern on said information plate;
   second sensing means arranged relative to a postion substantially corresponding to said center of said pattern;

movement distance detecting means for detecting a movement distance in response to a change of an output from said first sensing means; and movement direction detecting means for detecting a movement direction in response to a change of an output from said second sensing means.

2. A coordinate inputting apparatus according to claim 1, wherein said patterns are circles.

3. A coordinate inputting apparatus according to claim 1, wherein said first sensing means and said second sensing means each comprise a photoelectric converting element and light emitting means.

4. A coordinate inputting apparatus according to claim 2, wherein the number of said first sensing means is n (n being an integer) and each of said first sensing means is arranged at a respective one of a plurality of positions which are substantially on the periphery of one of said circles and which are equally spaced around the periphery of one of said circles.

5. A coordinate inputting apparatus according to claim 4, wherein said number n is four, and one pair of said first sensing means are disposed symmetrically relative to each other with respect to said center of one of said circles and detect said movement distance in a horizontal direction and the other two of said first sensing means are disposed symmetrically relative to each other with respect to said center of one of said circles and which detect said movement distance in a vertical direction.

6. A coordinate inputting apparatus comprising:

an information plate having a plurality of patterns provided in the form of matrix, at least one said pattern having a periphery and a center and each of said patterns being symmetrical with respect to its center;

a plurality of pairs of first reading sensors arranged relative to each other at positions which are symmetrical with respect to said center of said pattern and which are substantially on said periphery of said pattern on said information plate;

a second reading sensor arranged relative to a position substantially corresponding to said center of said pattern;

difference value output means for determining difference value between outputs from each of said plurality pairs of first reading sensors;

movement distance detecting means for detecting a movement distance in response to the difference value output from said difference value output means; and movement direction detecting means for detecting the level of the difference value output of said difference value output means so as to detect a movement direction, in response to an output from said second reading sensor.

7. A coordinate inputting apparatus according to claim 6, wherein said patterns are circles.

8. A coordinate inputting apparatus according to claim 6, wherein said first reading sensors and said second reading sensor each comprise a photoelectric converting element and light emitting means.

* * * * *

UNITED STATES PATENT AND TRADEMARK OFFICE
CERTIFICATE OF CORRECTION

PATENT NO. : 4,712,100

DATED : December 8, 1987

INVENTOR(S) : MASAO TSUNEKUNI, ET AL.

It is certified that error appears in the above-identified patent and that said Letters Patent is hereby corrected as shown below:

IN THE DRAWINGS

Sheet 3, Fig. 5, "CONVERTOR" should read --CONVERTER--.

COLUMN 1

Lines 23-24, "extrememly" should read --extremely--.
Line 36, "accuracy" should read --accuracy,--.

COLUMN 2

Line 13, "operating" should read --the operating--.
Line 14, "plate" should read --plate,--.
Line 16, "FIGS. 7A and 7C" should read --FIGS. 7B and 7C--.

COLUMN 4

Line 33, "(see FG. 7A)." should read --(see FIG. 7A).--.

COLUMN 6

Line 43, "scractchy," should read --scrstchy,--.

UNITED STATES PATENT AND TRADEMARK OFFICE
CERTIFICATE OF CORRECTION

PATENT NO. : 4,712,100

DATED : December 8, 1987

INVENTOR(S) : MASAO TSUNEKUNI, ET AL.

Page 2 of 2

It is certified that error appears in the above-identified patent and that said Letters Patent is hereby corrected as shown below:

COLUMN 8

Line 2, "matrix," should read --a matrix,--.
Line 14, "determining" should read --determining a--.
Line 16, "pairs" should read --of pairs--.

Signed and Sealed this

Fourteenth Day of June, 1988

Attest:

*Attesting Officer*

DONALD J. QUIGG

*Commissioner of Patents and Trademarks*